(12) United States Patent
Busse et al.

(10) Patent No.: US 7,125,018 B2
(45) Date of Patent: Oct. 24, 2006

(54) LOW-FRICTION SEAL

(75) Inventors: Herbert Busse, Stuttgart (DE); Hans-Dieter Fabrowsky, Neuhausen (DE)

(73) Assignee: Herbert Hanchen GmbH & Co. KG, Ostfildern (DE)

( * ) Notice: Subject to any disclaimer, the term of this patent is extended or adjusted under 35 U.S.C. 154(b) by 21 days.

(21) Appl. No.: 10/615,400

(22) Filed: Jul. 9, 2003

(65) Prior Publication Data

US 2004/0056424 A1    Mar. 25, 2004

Related U.S. Application Data

(63) Continuation of application No. 09/786,869, filed as application No. PCT/EP99/05952 on Aug. 13, 1999, now abandoned.

(30) Foreign Application Priority Data

Sep. 12, 1998  (DE) ................... 198 41 830

(51) Int. Cl.
  F16J 15/40      (2006.01)
  F16J 15/447     (2006.01)
  F16J 15/44      (2006.01)
  F16J 15/16      (2006.01)

(52) U.S. Cl. ............... 277/347; 277/351; 277/412; 277/422; 277/500

(58) Field of Classification Search ........ 277/347–351, 277/409, 411–412, 421–422, 500
See application file for complete search history.

(56) References Cited

U.S. PATENT DOCUMENTS

| 2,554,234 A | * | 5/1951 | Baudry et al. ........... 277/432 |
| 3,190,661 A | * | 6/1965 | Wahl et al. ............... 277/409 |
| 3,743,304 A | | 7/1973 | Lindenboom |
| 3,909,015 A | | 9/1975 | Kasahara |
| 3,915,459 A | * | 10/1975 | Kunderman ............. 277/411 |
| 4,229,011 A | | 10/1980 | Wikelski et al. |
| 4,334,688 A | | 6/1982 | Spargo et al. |
| 4,406,463 A | | 9/1983 | Fabrowsky |
| 4,504,069 A | | 3/1985 | Stenlund |
| 4,976,444 A | * | 12/1990 | Richards ................. 277/412 |
| 5,014,999 A | | 5/1991 | Makhobey |

(Continued)

FOREIGN PATENT DOCUMENTS

DE    1425506    1/1969

(Continued)

OTHER PUBLICATIONS

International Search Report, Jan. 24, 2000, EPO.

(Continued)

*Primary Examiner*—Vishal Patel
(74) *Attorney, Agent, or Firm*—Shlesinger Arkwright & Garvey LLP

(57) ABSTRACT

A low-friction seal comprising a quasi dimensionally stable sealing ring (44) that is accommodated with radial and axial clearance in a groove (30; 76) of one of two surface, whereby said surfaces are sealed off from each other and can move in a relative position to each other, and the peripheral section of the sealing ring protruding from the groove (30' 76) is placed opposite the other surface that is to be sealed. Means are provided between the side wall (34; 80, 82) of the groove on the side of the pressure-chamber and the sealing ring (44) in order to prevent pressure from spreading to the bottom (37, 78) of the groove, whereby radial deformation of the sealing ring in the direction of the surface that is to be sealed is avoided.

9 Claims, 3 Drawing Sheets

U.S. PATENT DOCUMENTS

| | | | | |
|---|---|---|---|---|
| 5,161,943 A | * | 11/1992 | Maier et al. | 415/170.1 |
| 5,322,298 A | * | 6/1994 | Maier | 277/430 |
| 5,403,019 A | | 4/1995 | Marshall | |
| 6,070,881 A | | 6/2000 | Longree | |

FOREIGN PATENT DOCUMENTS

| | | |
|---|---|---|
| DE | 1804557 | 11/1970 |
| DE | 4242213 | 6/1994 |
| DE | 9409779 | 8/1994 |
| EP | 0043918 | 1/1982 |
| EP | 0362510 | 4/1990 |
| EP | 0623768 | 11/1994 |
| FR | 2068325 | 8/1971 |

OTHER PUBLICATIONS

International Search Report mailed Mar. 2, 2002 (4pgs.).

* cited by examiner

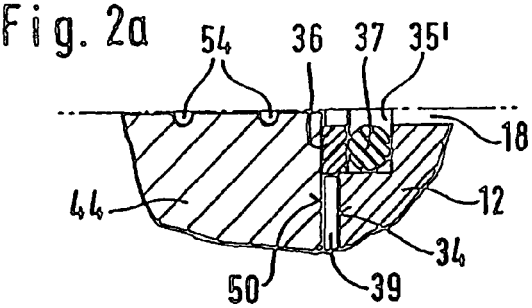
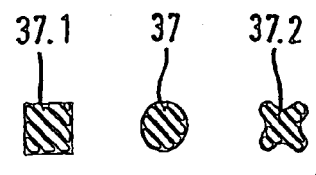
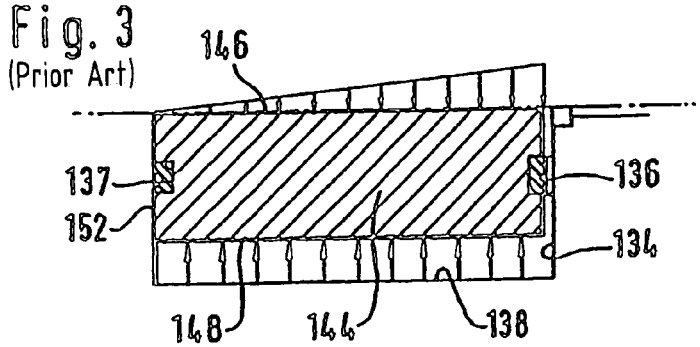
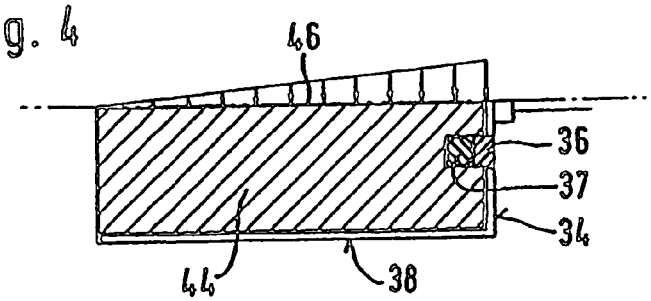
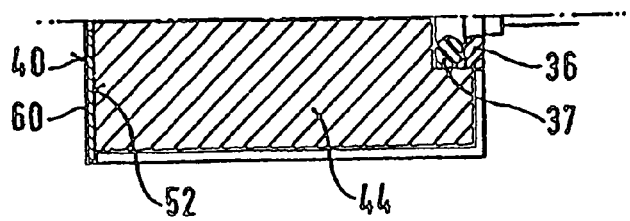
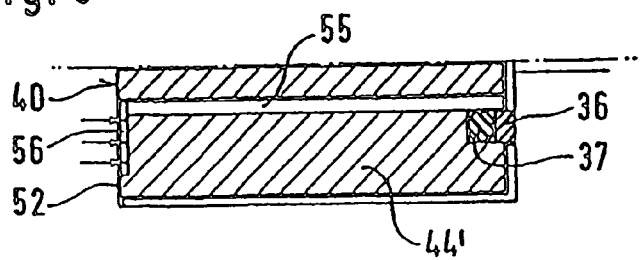

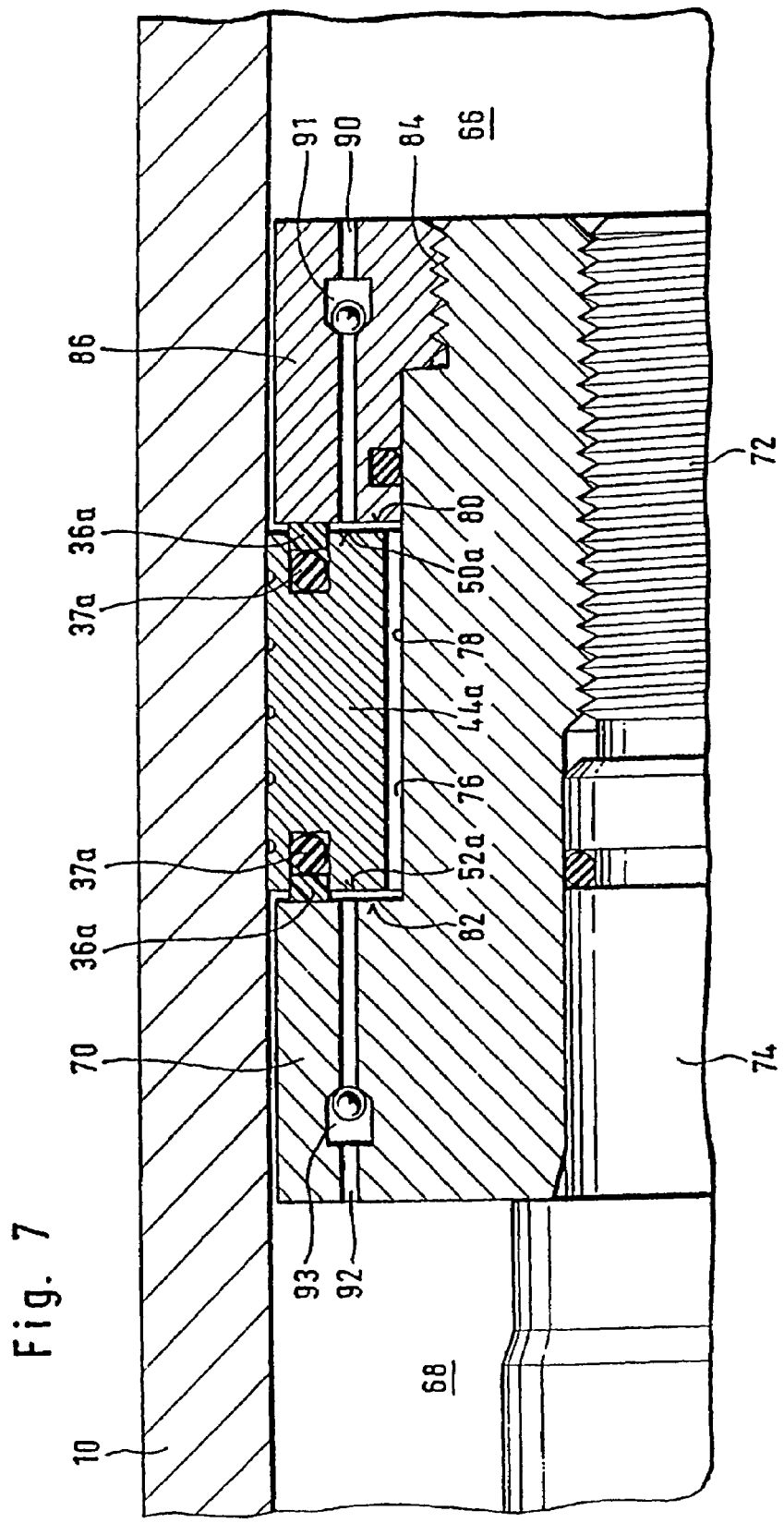

LOW-FRICTION SEAL

CROSS REFERENCE TO RELATED APPLICATIONS

This is a continuation of application Ser. No. 09/786,869, filed Mar. 12, 2001, which is now abandoned, which is a 371 of PCT/EP99/05952, filed Aug. 13, 1999, having claim for priority based upon German Patent Application No. 198 41 830.2, filed Sep. 12, 1998, all of which are incorporated herein by reference.

FIELD OF THE INVENTION

The present invention pertains to a low-friction seal for high-pressure and low-pressure applications which contains a sealing ring.

BACKGROUND OF THE INVENTION

A low-friction seal of this type is known from EP 0043 918 B1. This low-friction seal is realized in the form of a so-called contactless seal, i.e., a nearly frictionless seal, in which the sealing effect is realized by means of a sealing gap between the sealing ring and the location to be sealed. The viscous effect of the fluid situated in this sealing gap ensures an appropriate seal. Due to the contactless arrangement, this seal is, in contrast to conventional seals, theoretically frictionless. However, a residual friction which results from the adhesion of the fluid actually exists. For this reason, the following description refers to "low-friction" seals.

The previously mentioned known seal contains a dimensionally stable sealing ring that is accommodated with axial and radial clearance in a groove of one of two surfaces that need to be sealed relative to one another and move relative to one another. The periphery of the sealing ring which protrudes from the groove is arranged opposite to the other surface to be sealed, namely with a sliding fit. In this known seal, spacer means which allow an unobstructed propagation of pressure to the bottom of the groove are also provided between the sidewall of the groove on the side of the pressure chamber and the sealing ring, with the cylindrical surface of the sealing ring which protrudes from the groove adjoining the other surface to be sealed with a sliding fit and containing a series of small annular grooves arranged at longitudinal distances to one another. In order to supplement the sealing function of a sealing edge that acts upon the sidewall of the groove which is situated distant from the pressure chamber, an elastic sealing ring is arranged within the region of the sealing edge. In this known seal, the pressure medium is able to flow from the pressure chamber to the bottom of the groove between the spacers while attempting to escape past the sealing edge. However, the pressure medium is prevented from doing so because the sealing ring has a larger surface which is charged with pressure on the side of the spacers than on the side opposite the sealing edge, i.e., the sealing ring is held such that it adjoins the sealing edge by the pressure that propagates within the groove in an unobstructed fashion. This means that the sealing ring is essentially held in a floating fashion within the groove that is charged with the pressure medium. In order to achieve a reduced friction, this known seal does not fulfill any guide functions. Since the pressure medium that is propagated in the narrow gap between the surface to be sealed, e.g., a piston rod, and the periphery of the sealing ring attempts to escape from the pressure chamber past the sealing ring, hydrodynamic forces are created which cause the pressure medium to distribute around the piston rod in a largely uniform fashion and to preserve a concentric gap. The clearance between the sealing ring and the groove is so large that the pressure from the oil chamber is able to propagate to the bottom of the groove in an unobstructed fashion as long as said pressure continues through the slideway gap between the guide bushing and the piston rod. This known arrangement aims to reduce friction losses, in particular, pressure-dependent friction losses, between surfaces which move relative to one another in a translational fashion and to significantly increase the degree of efficiency.

Based on this state of the art, the invention aims to develop a seal of the initially mentioned type, in which a simplified design is achieved and the advantageous effects known from the state of the art are preserved. In addition, the pressures acting upon the sealing ring of the new seal should be realized such that materials with a greater expansion can also be used for the sealing ring.

According to the invention, this objective is achieved with a low-friction seal as set forth below.

OBJECTS AND SUMMARY OF THE INVENTION

A simplified design of the low-friction seal is achieved due to the arrangement of means for preventing a propagation of pressure to the bottom of the groove between the sidewall of the groove on the side of the pressure chamber and the sealing ring, namely because additional elements, i.e., means for preventing a propagation of pressure to the bottom of the groove, are now only provided between the sidewall of the groove that is situated closer to the pressure chamber and the sealing ring. The low-friction seal known from the state of the art, in contrast, contains spacer means between the sidewall of the groove on the side of the pressure chamber and the sealing ring as well as a sealing edge that acts upon the sidewall of the groove which is situated distant from the pressure chamber and within the region of which an additional elastic sealing ring is arranged.

In contrast to all concepts applied in contactless seals so far, the invention aims to create new pressure ratios on the sealing ring. Since the pressure medium no longer acts upon the bottom of the groove due to the means for preventing a propagation of pressure to the bottom of the groove, the pressure medium is only able to propagate in the narrow gap between the cylindrical surface of the sealing ring which protrudes from the groove and the other surface to be sealed. This results in only an internal pressure occurring on the (quasi-dimensionally stable) sealing ring. In the seal known from the state of the art, an external pressure that results from charging the bottom of the groove with pressure as well as an internal pressure occurs on the sealing ring.

These new pressure ratios cause the new sealing ring to deform differently than the sealing ring of the seal known from EP 0043 918 B1. Since only an internal pressure exists on the sealing ring according to the invention, a (radial) deformation of the sealing ring in the direction of the surface to be sealed no longer occurs, i.e., a change caused by a compression of the sealing ring no longer has to be taken into consideration when calculating the dimensions of the sealing gap between the surface of the sealing ring which protrudes from the groove and the surface to be sealed. Consequently, the sealing gap may amount to only a few μm without the risk that the functional reliability will be impaired due to a jamming of the sealing ring on the moving opposite surface, namely even at unintentionally high pressures in the system. In addition, this narrow sealing gap essentially remains unchanged on the side of the sealing ring which is situated distant from the pressure chamber, namely independently of the intensity of the operating pressure, because only a slight pressure is present at this location due to the reduction in pressure. The deformation of the sealing ring which is caused by the internal pressure results, if suitable materials are used, in a larger inflow tapering between the sealing ring and the surface to be sealed. This larger inflow tapering improves the hydraulic centrifugal forces on the sealing ring such that a contactless sealing system with a very narrow sealing gap and a concentric position of the sealing surfaces relative to one another results. These parameters (no contact between the sealing surfaces, small gap height and concentric position) fulfill the most important prerequisites for a high-quality seal between two surfaces which move relative to one another.

In one embodiment of the invention, the means for preventing a pressure propagation contain a sealing element that is effective between the sealing ring and the sidewall of the groove on the side of the pressure chamber.

The means for preventing a pressure propagation advantageously also contain a formed part that acts upon the sealing element in the axial direction.

Due to the design of the means for preventing a pressure propagation in the form of a sealing element upon which a formed part acts in the axial direction, a simple and effective bridging of the gap between the sealing ring and the sidewall of the groove on the side of the pressure chamber which provides a superior seal is achieved.

In another embodiment, the sealing element consists of a second sealing ring, in particular, of extrusion-resistant plastic material, the ring width of which is smaller than the ring width of the sealing ring accommodated in the groove, with the thickness of the second sealing ring being greater than the width of the gap between the sealing ring and the sidewall of the groove on the side of the pressure chamber. The formed part preferably consists of a flexible ring, in particular, an elastic ring of plastic and/or rubber. Due to this measure, the sealing ring that forms the second sealing element is pressed against the surface to be sealed in the gap between the sealing ring and the sidewall of the groove by a flexible ring (rubber-prestressed seal). Since the sealing ring has a thickness that is greater than the width of the gap between the sealing ring and the side wall of the groove on the side of the pressure chamber, the bottom of the groove is sealed, i.e., a pressure propagation to the bottom of the groove is prevented.

In another embodiment of the invention, the formed part is arranged in an axially opening annular groove in the sidewall of the groove and presses the sealing element against the sealing ring.

In another embodiment of the invention, the formed part is arranged in an axially opening annular groove in the sealing ring and presses the sealing element against the sidewall of the groove.

In one particularly advantageous embodiment of the invention, a deformation of the formed part takes place if it is subjected to pressure, namely such that the pressing force of the formed part against the sealing element is increased. This is, for example, achieved by choosing the dimensions of the axially opening annular groove, in which the formed part is arranged, and the formed part, such that the propagating pressure medium is able to penetrate into the annular groove and deform the formed part at this location due to the exerted pressure in such a way that it expands in the axial direction and thus increases the pressing force against the sealing element.

In another advantageous embodiment of the invention, a friction-reducing intermediate disk is arranged between the sidewall of the groove which is situated distant from the pressure chamber and the sealing ring. Such an intermediate disk optimizes the centering effect when a pressure is exerted, i.e., it optimizes a coaxial self-alignment of the sealing ring relative to the surface to be sealed (piston rod). The intermediate disk is advantageously coated so as to achieve a reduction in friction.

In another embodiment, a hydrostatic alleviation is provided between the sidewall of the groove which is situated distant from the pressure chamber and the sealing ring. This hydrostatic alleviation simplifies the centering of the sealing ring because the surfaces that are charged with pressure are designed such that only a slight pressing force of the sealing ring is generated on the sidewall of the groove.

In one particularly advantageous embodiment of the invention in which two pressure chambers are axially arranged to both sides of the groove, means for preventing a pressure propagation to the bottom of the groove are provided between both sidewalls of the groove and the sealing ring, and at least one drainage channel with a return valve for diverting the pressure medium admitted into the groove is arranged between the means for preventing a pressure propagation. The principle according to the invention for preventing a pressure propagation to the bottom of the groove is particularly effective in a double cylinder, i.e., a cylinder, both sides of which are alternately charged with pressure. In known double cylinders, two sealing rings are required for realizing an efficient seal within the region of the piston rod bushing (see EP 0 043 918 B1). However, the invention makes it possible to achieve such a seal with only one sealing ring, which contains means for preventing a pressure propagation on each groove sidewall that faces a pressure chamber.

Additional advantages and embodiments of the invention result from the description and the enclosed figures.

It is understood that the aforementioned characteristics as well as the characteristics described below cannot only be applied in the respectively cited combination, but also in other combinations or individually without deviating from the scope of the present invention.

Embodiments of the invention are schematically illustrated in the figures. The invention is described in greater detail below with reference to these figures.

BRIEF DESCRIPTION OF THE DRAWINGS

FIG. 2*a* shows a sectional representation of a second embodiment of the seal according to the invention.

FIG. 2*b* shows different cross-sectional shapes of the formed part used in the seal according to the invention.

FIG. 3 shows the basic pressure ratios on a seal known from the state of the art.

FIG. 4 shows the basic pressure ratios on the seal according to the invention which is shown in FIG. 1.

FIG. 5 shows another embodiment in the form of the seal according to the invention which is shown in FIG. 1 with a friction-reducing intermediate disk.

FIG. 6 shows another embodiment in the form of the seal according to the invention which is shown in FIG. 1 with a hydrostatic alleviation.

FIG. 7 shows another embodiment of a seal according to the invention in the form of a longitudinal section though a hydraulic cylinder, in which identically intense pressures may be present on both sides of the piston.

DETAILED DESCRIPTION OF THE INVENTION

Figure 1:
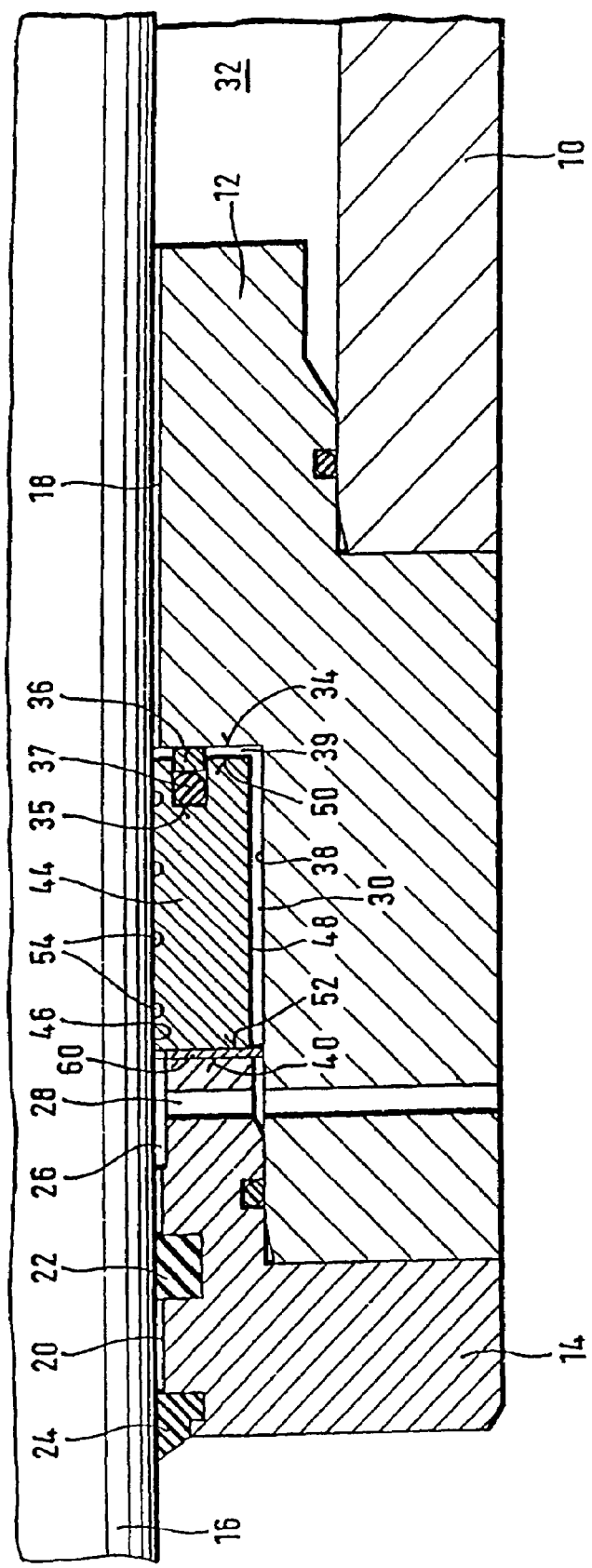
FIG. 1 shows a longitudinal section through a hydraulic cylinder within the region of the piston rod bushing on one end and a seal according to the invention.

According to FIG. 1, a guide bushing 12 for a piston rod which protrudes into the interior of the cylinder is placed onto the end of a hydraulic cylinder 10 and connected to the cylinder together with a cover part 14 by means of screws which are not shown. A piston rod 16 of the hydraulic cylinder 10 can be guided with the aid of guide rings (not shown) which are inserted into grooves of the guide bushing 12 and the cover part 14. A sealing ring 22 as well as an outer scraper ring 24 are arranged in peripheral grooves in a cover bore 20. The cover part 14 also contains an annular collection groove 26 and a leakage oil bore 28 that extends outward from the annular collection groove.

A cylindrical bore that extends from the outer end of the guide bushing 12 forms an annular groove 30 together with the adjacent free end face of the cover part 14.

The hydraulic cylinder contains a pressure chamber or oil chamber 32 for accommodating the pressure medium. The pressure chamber or oil chamber 32 is connected to the annular groove 30 via a slideway gap 18 between the guide bushing 12 and the piston rod 16.

A sealing ring 44 that consists of metal or another dimensionally stable material, e.g., a plastic with such properties, is accommodated in the groove 30. The sealing ring 44 has a cylindrical inner surface 46, a cylindrical outer surface 48 as well as end faces 50 and 52 that essentially extend in the radial direction. The dimensions of the sealing ring 44 are chosen such that it surrounds the piston rod 16 with its cylindrical inner surface 46, namely with a tight sliding fit, with the thee remaining outer surfaces 48, 50, 52 of the sealing ring being accommodated in the groove 30 with a certain clearance on all sides.

The clearance between the sealing ring 44 and the groove 30 is so large that the pressure from the oil chamber 32 is, as long as it continues though the slideway gap 18 between the guide bushing 12 and the piston rod 16, able to propagate to the bottom 38 of the groove between the sidewall 34 of the groove on the side of the pressure chamber and the end face 50 of the sealing ring 44 on the side of the pressure chamber, with the radial movement of the piston rod within the sliding fit clearance not being obstructed.

In order to prevent this pressure propagation, means for preventing a pressure propagation are provided between the sidewall 34 of the groove on the side of the pressure chamber and the sealing ring 44. In the embodiment shown in FIG. 1, these means consist of a rubber-prestressed plastic seal 36, 37 that contains an annular sealing element of plastic 36 and a flexible formed part 37 of rubber which acts upon this sealing element. The sealing element 36 has a ring width that is smaller than the ring width of the sealing ring 44 accommodated in the groove 30 and a thickness that is greater than the width of the gap 39 between the sealing ring 44 and the sidewall 34 of the groove on the side of the pressure chamber.

The rubber-prestressed plastic seal 36, 37 is arranged in an axially opening annular groove 35 in the end face 50 of the sealing ring 44 on the side of the pressure chamber. In this case, the formed part 37 is arranged in the groove bottom of the annular groove 35, with said formed part pressing the sealing element 36 against the sidewall 34 of the groove on the side of the pressure chamber.

When charging the seal with the pressure medium from the pressure chamber 32 via the slideway gap 18, the pressure medium is introduced into the annular groove 35 past the sealing element 36 and acts upon the flexible formed part 37 at this location. The pressure medium causes the formed part 37 to deform in such a way that the pressing force of the formed part 37 against the sealing element 36 is increased, i.e., the sealing element is more intensely pressed against the sidewall 34 of the groove on the side of the pressure chamber. The plastic ring of the sealing element consists of materials that minimize the friction on the sidewall 34 of the groove to such a degree that the hydraulic centering of the sealing ring relative to the piston rod is improved. The function of providing a seal between the sealing element 36 and the annular groove 35 is also fulfilled by the formed part 37. Due to the utilization of such a rubber-prestressed seal 36, 37, a seal and a gap bridging between the sealing ring 44 and the sidewall 34 of the groove on the side of the pressure chamber is achieved, with said seal and gap bridging allowing a smooth alignment of the sealing ring 44 due to the low friction between the guide bushing 12 and the seal 36.

These measures cause the pressure medium to be able to propagate only between the cylindrical inner surface 46 of the sealing ring 44 and the surface of the piston rod 16 to be sealed, with a nearly continuous pressure decreases taking place over the length of the sealing ring 44. This is described below with reference to FIGS. 3 and 4.

The cylindrical inner surface 46 is provided with several small annular grooves 54 that are preferably arranged at identical longitudinal distances from one another.

FIG. 2 shows another embodiment of the means 36, 37 for preventing a pressure propagation to the bottom 38 of the groove. In the embodiment that is sectionally illustrated in FIG. 2, the axially opening annular groove 35' is arranged in the guide bushing 12 such that it opens toward the sidewall 34 of the groove on the side of the pressure chamber. In addition, the annular groove 35' is connected to the slideway gap 18. As described previously with reference to FIG. 1, the sealing element 36 is arranged in the annular groove 35' such that it bridges the gap 39 between the sealing ring 44 and the sidewall of the groove on the side of the pressure chamber, with the formed part 37 being accommodated in the bottom of the annular groove 35'. The formed part acts upon and presses the sealing element 36 against the end face 50 of the sealing ring 44 on the side of the pressure chamber.

When the seal is charged with pressure, the pressure medium is introduced into the annular groove 35' via the slideway gap 18 and deforms the flexible formed part 37 in the previously described fashion at this location such that the pressing force of the sealing element 36 on the end face 50 of the sealing ring 44 to be sealed is increased while the gap between the sealing element 36 and the annular groove 35' is simultaneously sealed.

FIG. 2b shows two other cross-sectional shapes 37.1 and 37.2 of the formed part 37 in addition to the formed part with a circular cross section which is used in the embodiments shown in FIGS. 1 and 2a.

The pressure ratios occurring on the sealing ring 44 and the pressure ratios occurring in accordance with the state of the art are schematically compared in FIGS. 3 and 4. FIG. 3 shows a sectional representation of a sealing ring 144 as it is, for example, known from the initially cited EP 0043 918 B1. This sealing ring 144 contains spacer elements 136 which extend to the sidewall 134 of the groove on the side of the pressure chamber such that an unobstructed pressure propagation to the bottom 138 of the groove is possible. On its end face 152, which is situated distant from the pressure chamber, the sealing ring 144 contains a sealing element 137. Due to the unobstructed pressure propagation to the bottom 138 of the groove, the cylindrical outer surface 148 of the sealing ring 144 which points toward the bottom of the groove is charged with pressure in a constant fashion over the entire length of the sealing ring 144. The cylindrical inner surface 146 of the sealing ring 144 is also charged with pressure due to the pressure medium that penetrates between the sealing ring 144 and the surface to be sealed. However, this pressure decreases almost continuously over the length of the sealing ring 144. Due to the thus-generated forces which act in opposite directions, a tapering of the sealing ring which originally had a rectangular cross section results because the sealing ring 144 is increasingly pressed in toward its end that is situated distant from the pressure chamber along its cylindrical outer surface 148.

The pressure ratios on the seal according to the invention are illustrated in FIG. 4. According to this figure, the sealing ring 44 is only charged with pressure on its cylindrical inner surface 46 due to the means 36, 37 for preventing a pressure propagation to the bottom 38 of the groove which are arranged between the sealing ring 44 and the sidewall 34 of the groove on the side of the pressure chamber. This also results in a tapering of the sealing ring 44, but with an initial value that is different in comparison to the tapering known from the state of the art because the size of the gap between the piston rod 16 and the sealing ring 44 now increases from its end that is situated distant from the pressure chamber to its end on the side of the pressure chamber due to the more intense influence of the pressure upon the sealing ring 44 on its end on the side of the pressure chamber (no counter-pressure from the bottom of the groove!). This advantageously causes a smaller gap between the sealing ring and the surface to be sealed to exist below the maximum permissible operating pressure. In the arrangement known from the state of the art, the so-called manufactured gap between the sealing ring and the surface to be sealed, i.e., the difference between the inside diameter of the sealing ring and the outside diameter of the piston rod, needs to be dimensioned in the form of the sum of the gap between the sealing ring and the piston rod (approximately 5–10 µm) and the compression of the sealing ring which results from the differential pressure. In the solution according to the invention, the manufactured gap only corresponds to the minimal sealing gap such that a significantly smaller quantity of oil is discharged because the operating pressures usually lie below the maximum permissible pressure. In addition, the inflow tapering occurring in accordance with the invention improves the hydraulic centering forces if the materials are suitably chosen.

It should again be expressly noted that FIGS. 3 and 4 do not show any actually occurring pressure ratios, but rather schematic and basic illustrations of pressure ratios in order to better comprehend the function of the invention.

According to the invention, the sealing ring 44 is "automatically" centered if the seal is charged with pressure. The sealing ring which is initially not centered (i.e., not arranged concentric to the piston rod), in particular, due to the influence of the gravitational force, is pressed against the sidewall 40 of the groove which is situated distant from the pressure chamber when the pressure medium acts upon the sealing ring through the slideway gap 18. The pressure medium simultaneously penetrates between the cylindrical inner surface of the sealing ring and the outer surface of the piston rod and distributes itself along the periphery of the piston rod such that a centering of the sealing ring is caused.

In order to simplify this centering process, measures for reducing the friction between the sealing ring and the sidewall of the groove which is situated distant from the pressure chamber may be provided. FIG. 5 shows a sectional representation of the sealing ring 44 according to FIG. 1, with an intermediate disk 60 for reducing the static friction and the sliding friction between the two respective surfaces being inserted between the sidewall 40 of the groove which is situated distant from the pressure chamber and the end face 52 of the sealing ring 42 which is situated distant from the pressure chamber. The intermediate disk 60 for reducing the friction on the end face may, for example, consist of a metal or plastic disk that is advantageously provided with a friction-reducing coating.

In another embodiment of the invention, the friction may be reduced on the end face 52 of the sealing ring 44 which is situated distant from the pressure chamber by means of a hydrostatic alleviation as shown in FIG. 6. For this purpose, the sealing ring 44' contains one or more channels 55 that axially extend though the sealing ring 44' and divert part of the pressure medium from the pressure chamber 32 between the sidewall 40 of the groove which is situated distant from the pressure chamber and the end face 52 which is situated distant from the pressure chamber. The pressure medium distributes itself at this location (this distribution may be promoted by arranging a depression 56 either on the end face 52 or on the sidewall 40 of the groove) and generates a counter-force which acts upon the sealing ring 44' and leads to a reduction in the pressing force upon the sidewall 40 of the groove situated distant from the pressure chamber, and consequently a reduction in the friction between these surfaces.

FIG. 7 shows the utilization of the sealing principle according to the invention with an example of a piston 70 in a hydraulic cylinder 10, in which identically intense pressures may be alternately present to both sides of the piston. The seal according to FIG. 7 has a symmetric design to both sides of the longitudinal center of the piston. In contrast to the seal known from the state of the art (EP 0043 918 B1), only one sealing ring 44a is required instead of two sealing rings.

The piston of the hydraulic cylinder 10 which is illustrated in FIG. 7 in the form of a schematic longitudinal section consists of a piston body 70 that is screwed onto a threaded section 72 of a piston rod 74 and contains an annular groove 76. In addition, the hydraulic cylinder 10 contains one respective pressure chamber 66, 68 within the region of each piston end.

The annular groove 76 has sidewalls 80, 82 that axially point to the pressure chambers 66, 68, with the right groove sidewall 80 being formed by an annular part 86 that is screwed onto a threaded section 84 of the piston body 70 in this figure. A sealing ring 44a of metal or another suitable material is accommodated in the annular groove 76. Both end faces 50a, 52a of this sealing ring contain means for preventing a pressure propagation to the bottom 78 of the groove. In the embodiment shown, these means respectively consist of a sealing element 36a of plastic (plastic sealing ring) and a flexible formed part 37a of rubber which axially acts upon the plastic sealing ring, namely analogous to the previously described embodiments.

The piston body 70 also contains two drainage channels 90, 92 that essentially extend in the axial direction and connect the annular groove 76 to the pressure chambers 66 and 68, respectively. One respective valve is provided in the two drainage channels 90, 92, with said valve locking in the direction of the pressure that originates from the assigned pressure chamber, i.e., the drainage channels 90, 92 serve for diverting the pressure medium that was admitted into the region of the bottom 78 of the annular groove 76 into the respective pressure chambers 66 and 68 that are arranged opposite one another.

In an embodiment of the hydraulic cylinder which is not illustrated in greater detail and in which identically intense pressures occur simultaneously on both sides of the piston, a drainage channel that ends within the region of the bottom of the groove is provided, with said drainage channel connecting the groove to an essentially nonpressurized space.

Due to the altered fashion in which pressure acts upon the sealing ring, the invention allows the utilization of materials with a higher Young's modulus for the sealing ring while achieving positive effects with respect to the hydraulic centering forces and leakage problems. In seals known from the state of the art, the lowest possible Young's modulus (i.e., small expansion of the sealing ring) needs to be observed. This is why composite materials, in particular, coated steel, are preferably utilized. The scope of the invention makes it possible to utilize seals consisting of different materials, preferably sealing rings that are manufactured from nonferrous metals.

Naturally, the invention is not limited to the embodiments that are illustrated in the figures, but also covers other concrete designs that utilize the principle of the invention. For example, the annular groove 30 which is situated in the guide bushing 12 in the embodiment according to FIG. 1 naturally may also be accommodated in a differently designed component that is situated opposite to or surrounds the surface to be sealed.

The invention claimed is:

1. A low friction seal assembly comprising:
   a) a guide element for guiding a shaft, said guide element having a groove extending therein, said groove having a bottom wall and a first side wall;
   b) a sealing ring, said sealing ring received within said groove, said sealing ring having a cylindrical inner surface adapted to be positioned adjacent a shaft surface to be sealed, an end face disposed adjacent said groove first side wall and an outer cylindrical surface disposed adjacent said groove bottom wall; and
   c) a seal, said seal disposed between said sealing ring end face and said groove first side wall so that when said seal is subjected to a pressure medium, propagation of the pressure medium is caused to take place only between said cylindrical inner surface of said sealing ring and the shaft surface to be sealed with a substantially continuous decrease in pressure occurring along the length of said sealing ring.

2. A low friction seal assembly as in claim 1 and wherein said seal includes an annular sealing element in the form of a plastic sealing ring coaxially aligned with said sealing ring and having a width less than that of said sealing ring and a thickness greater than the distance extending between said groove first side wall and said sealing ring end face.

3. A low friction seal assembly as in claim 2 and wherein said seal further includes a formed part, said formed part is operatively associated with said plastic sealing ring so that when said seal is charged with a pressure medium, said formed part will press said plastic sealing ring against said groove first side wall.

4. A low friction seal assembly as in claim 3 and further including:
   a) an annular groove, said annular groove extends into said sealing ring end face and is configured to receive said formed part so that when said seal is charged with a pressure medium said formed part is deformed in such a manner that the force of said plastic sealing ring pressing against said groove first side wall is caused to be increased.

5. A low friction seal assembly as in claim 3 and wherein said formed part is a ring, said ring is at least one of flexible and elastic and is constructed from at least one of plastic and rubber material.

6. A low friction seal assembly as in claim 1 and wherein said sealing ring has a second end face and said guide element groove has a second side wall, a friction-reducing intermediate disk is provided between said sealing ring second end face and said guide element groove second side wall.

7. A low friction seal assembly as in claim 6 and further including:
   a) at least one hydrostatic relief channel, said at least one hydrostatic relief channel operatively associated with said sealing ring and extending therein from said end face to said second end face to provide fluid communication therebetween.

8. A low friction seal assembly as in claim 1 and further including:
   a) at least one annular groove, said at least one annular groove extending in said sealing ring cylindrical outer surface.

9. A low friction seal assembly as in claim 1 and further including:
   a) a second side wall, said second side wall associated with said guide element groove; and
   b) a drainage channel, said drainage channel operatively associated with said second side wall and extending outwardly through said guide element from said second side wall.

* * * * *